(12) United States Patent
Kukkonen et al.

(10) Patent No.: US 11,548,184 B2
(45) Date of Patent: Jan. 10, 2023

(54) COMPOSITION AND METHOD OF MANUFACTURING THE SAME

(71) Applicant: Palonot Oy, Vantaa (FI)

(72) Inventors: Jari Kukkonen, Vantaa (FI); Timo Nissinen, Vantaa (FI)

(73) Assignee: Palonot Oy, Vantaa (FI)

( * ) Notice: Subject to any disclaimer, the term of this patent is extended or adjusted under 35 U.S.C. 154(b) by 629 days.

(21) Appl. No.: 16/492,172

(22) PCT Filed: Mar. 9, 2018

(86) PCT No.: PCT/FI2018/050173
§ 371 (c)(1),
(2) Date: Sep. 9, 2019

(87) PCT Pub. No.: WO2018/162804
PCT Pub. Date: Sep. 13, 2018

(65) Prior Publication Data
US 2020/0039106 A1    Feb. 6, 2020

(30) Foreign Application Priority Data

Mar. 9, 2017  (FI) ...................................... 20175221

(51) Int. Cl.
| | | |
|---|---|---|
| B27K 3/16 | (2006.01) | |
| B32B 21/13 | (2006.01) | |
| B32B 21/14 | (2006.01) | |
| B27K 3/52 | (2006.01) | |
| B27K 3/36 | (2006.01) | |
| C09K 21/10 | (2006.01) | |
| C09K 21/04 | (2006.01) | |
| C09K 21/12 | (2006.01) | |
| B27K 3/08 | (2006.01) | |

(52) U.S. Cl.
CPC ............... *B27K 3/166* (2013.01); *B27K 3/08* (2013.01); *B27K 3/36* (2013.01); *B27K 3/52* (2013.01); *B32B 21/13* (2013.01); *B32B 21/14* (2013.01); *C09K 21/04* (2013.01); *C09K 21/10* (2013.01); *C09K 21/12* (2013.01); *B27K 2240/30* (2013.01)

(58) Field of Classification Search
None
See application file for complete search history.

(56) References Cited

U.S. PATENT DOCUMENTS

| | | | |
|---|---|---|---|
| 3,686,290 A | 8/1972 | Carroll | |
| 5,916,356 A * | 6/1999 | Williams | ............. A01N 43/653 514/501 |
| 7,052,682 B2 * | 5/2006 | Ohta | ........................ A61K 8/39 424/70.2 |
| 8,361,210 B2 | 1/2013 | Ahlnaes et al. | |
| 9,125,404 B2 | 9/2015 | Vuori et al. | |
| 9,132,569 B2 | 9/2015 | Saari | |
| 2011/0088590 A1 | 4/2011 | Ahlnaes et al. | |
| 2011/0098205 A1* | 4/2011 | Lee | ....................... C11D 3/3418 510/176 |
| 2014/0147691 A1* | 5/2014 | Humphrey | ............. A01N 59/20 514/184 |
| 2014/0370320 A1* | 12/2014 | Humphrey | ............... B27K 3/22 427/428.01 |
| 2015/0201621 A1 | 7/2015 | Brückner et al. | |
| 2021/0339424 A1* | 11/2021 | Kukkonen | ............. B27K 3/166 |

FOREIGN PATENT DOCUMENTS

| | | |
|---|---|---|
| CA | 811736 A | 4/1969 |
| CN | 102732368 A | 10/2012 |
| CN | 103788325 A | 5/2014 |
| CN | 104312657 A | 1/2015 |
| CN | 105062270 A | 11/2015 |
| CN | 106118615 A | 11/2016 |
| EP | 1843880 B1 | 4/2014 |
| FI | 121917 B | 6/2011 |
| FI | 122723 B | 6/2012 |
| JP | S63301803 A | 12/1988 |
| JP | H0822809 B2 | 3/1996 |
| JP | H10278003 A | 10/1998 |
| JP | 2012091409 A | 5/2012 |
| JP | 2016007822 A | 1/2016 |
| WO | WO9100307 A1 | 1/1991 |
| WO | WO2006072659 A1 | 7/2006 |

OTHER PUBLICATIONS

Wang et al: Fire performance of plywood. Bioresources, vol. 9(3), 2014, pp. 4934-4945.

Xia et al: Synthesis of 1-hydroxy ethylidene-1, 1-diphosphonic ammonium and the promise of this ammonium salt as an intumescent flame retardant in polystyrene. Polymer Degradation and Stability, Jan. 22, 2014, vol. 102, pp. 186-194.

Östman et al: Innovative eco-efficient high fire performance wood products for demanding applications. Final report for Vinnova-Tekes project InnoFireWood. SP Wood Technology SP Report 2006:30, Stockholm 2006.

\* cited by examiner

*Primary Examiner* — Joseph D Anthony
(74) *Attorney, Agent, or Firm* — Laine IP Oy

(57) ABSTRACT

Fire retardant composition for treatment of various wood products, method of producing the same and uses thereof. The compositions comprise an aqueous solution of bisphosphonate selected from 1-hydroxyethane 1,1-diphosphonic acid, an alkanol amine, and optionally an alkaline agent, the composition having a pH in the range of 4.0 to 7.0. The composition can be produced by mixing together 30 to 50 parts by weight of 1-hydroxyethane 1,1-diphosphonic acid; 1 to 10 parts by weight of an alkanol amine or mixture thereof, said alkanol amine being added in free form; and optionally 0.1 to 40 part by weight of an alkaline agent; and water. The compositions can be used for protecting wood not only against fire but also against mould, rot, blue stain, insect such as termite attacks on wood, dimensional changes, or a combination thereof due to environmental influence.

17 Claims, No Drawings

COMPOSITION AND METHOD OF MANUFACTURING THE SAME

TECHNICAL FIELD

The present invention relates to fire protection of wood materials. In particular, the present invention concerns methods of treating wood materials as well as compositions for retarding fire and to methods of producing such compositions.

BACKGROUND ART

Wood is the most abundant non-toxic, recyclable and biodegradable natural material, valued as a construction material because of its appearance and its high strength at low density. Recent architectural trends include the design and construction of increasingly tall buildings with structural components comprised of engineered wood referred to by names including; cross laminated timber (CLT), laminated veneer lumber (LVL), glued laminated timber (Glulam), plywood, or solid timber used as outdoor panel material.

Construction is currently underway on a 10-story apartment building in Melbourne, Australia, with taller structures up to 30 stories under design in Norway, Austria, Vancouver and in Finland. These buildings are cited for their advantages in sustainability resulting from the use of wood as a renewable construction material.

On the other hand lack of proper resistance against fire is an important drawback in using wood for constructions. Therefore, in building codes all over the world, including EU and countries such as USA, Japan and Australia, it is required that only wood that has been treated with proper fire retardants be used in walls, floors and roof assemblies. By properly protecting wood, the spread of smoke and fire can be contained and the time available for evacuation of the buildings and helping persons to move to safety be extended.

Many fire retardant compositions, for example of the kind described in U.S. Pat. No. 9,132,569 B2 and patent documents referred to therein, are based on pressure impregnation of the fire retardant into the wood. Alternatively, the chemical compositions described contain inorganic phosphate salts, for example as ammonium salts of phosphoric acid, such as APP, MAP and DAP, or boron contains agents, such as borates, or boric acid that are not environmentally acceptable or they are not enough powerful to fulfil B-s1,d0 fire class at low retention levels. Moreover wood items treated with fire retardants of the APP, MAP and DAP type, are prone to fysical and chemical deterioration if the treated items absorb moisture.

Some very latest patents and one literature review describe the use of organic phosphote salts, such as ammonium salt of HEDP acid as a promising fire retardant chemical instead of inorganic phosphates or boron compounds.

HEDP is an abbreviation for a bisphosphonate compound, 1-hydroxyethane 1,1-diphosphonic acid, also known by the name etidronic acd. HEDP is a chelating agent which has antioxidant properties.

For example Birgit Östman et al. suggest, in their report titled "Innovative eco-efficient high fire performance wood products for demanding applications" (Final report for Vinnova-Tekes project InnoFireWood. SP Wood Technology SP REPORT 2006:30), that the ammonium salt of HEDP acid be used as a fire retardant for wooden items.

The report describes the use of organic phosphonates including HEDP as fire retardant for pine sapwood and thermally modified spruce. The liquid concentration in the fire tests is stated as being 20, 40 and 60 wt-% before neutralization with ammonia. The pH values of the test liquids is not mentioned. For pine sapwood the mean retention of the fire retardant (as 100 wt-% concentration) was 89 $kg/m^3$ (20 wt-%), 181 $kg/m^3$ (40 wt-%) and 290 $kg/m^3$ (60 wt-%), respectively. The treatment technique was pressure impregnation with vacuum at −92 kPa (92 kPa below standard pressure) for 30 minutes followed by an absolute pressure of 1.0 MPa for 120 minutes. All wood specimens were weighed before and after the impregnation and after the conditioning at 50% RH at 23° C. Cone calorimeter tests made using a 50 $kw/m^2$ heat flux indicated fire class B and in some cases class C for pressure impregnated pine sapwood samples. Thermally modified spruce was pressure impregnated using 40 wt-% ammoniated HEDP and the retention was 110 $kg/m^2$. Cone calorimeter tests made using 50 $kw/m^2$ heat flux indicated fire class B or C depending on the used fire class prediction model.

U.S. Pat. No. 8,361,210 B2 (Ahlnäs & Kukkonen) discloses a method of treating wood, in which the wood is contacted with a mixture of liquid or water-soluble organic ammonium carboxylate and an active ingredient which repels invertebrates. The purpose of the known art is to provide a method and a composition for treating wood, in which the composition is both well absorbed and has good retention. In the most advantageous embodiment, the organic ammonium carboxylate is selected from the group comprising a salt or a complex of formic acid and monoethanolamine and a salt or a complex of propionic acid and monoethanol amine.

According to U.S. Pat. No. 8,361,210 B2 the wood-preservative active ingredient, which is used in combination with mentioned ammonium carboxylate, may contain a chelating agent, which is selected from the group comprising of an aminopolycarboxylic acid or salt thereof, a hydroxy acid or a salt thereof, or a phosphonate (i.e. organic phosphonate i.e. organophosphate) or a mixture thereof. Preferably the chelating agent according to the patent is a chelating agent which is capable of binding iron and manganese ions and which contains phosphorus (P) in the molecular structure. Such a molecule is HEDP.

According to the examples of U.S. Pat. No. 8,361,210 B2 the composition was applied onto the surface of plywood board made of spruce or birch. The composition was absorbed well into wood, at about 250 $g/m^2$, when applied once. The treated wood material exhibited fire-protecting properties in a fire test according to standard EN5660.

U.S. Pat. No. 9,125,404 B2 (Vuori & Nissinen) discloses a method for treating wood in order to improve its properties of use and storage. In the method the wood to be treated is contacted with a treatment composition comprising monoester, diester or triester or a mixture thereof formed by a water soluble $C_1$-$C_{10}$ alcohol and formic acid as an equilibrium solution. The composition contains formate ester of formic acid, preferably as glyceryl formate, for treatment of wood and it may contain HEDP or a salt of HEDP. Compositions given in U.S. Pat. No. 9,125,404 B2 for protecting wood against fire comprises glyceryl formate 1-50% by weight, free formic acid 1-10% by weight, 1-50% by weight HEDP or a salt thereof, the balance being glycerol and water. By impregnation with this solution a wood product is obtained the fire resistance class of which is the highest possible and that is very durable against decaying agents and termites.

FI 121917 B (Mertaniemi et al.) discloses a composition for treating wood-based material contains at least one $C_1$-$C_7$ monocarboxylic acid salt or $C_1$-$C_7$ monocarboxylic acid or a mixture thereof as active agent against deterioration of wood. The composition also contains alkyd emulsion of high unsaturated fatty acid content and/or aluminum ion containing compound in the form of polyaluminium formate in the same aqueous liquid carrier as the $C_1$-$C_7$ monocarboxylic acid salt or $C_1$-$C_7$ monocarboxylic acid or a mixture thereof. The composition may further contain a complexing agent capable of binding transition metals as an auxiliary wood preservative aid. The complexing agent used as an auxiliary wood preservative aid is in particular an aminopolycarboxylic acid or salt thereof, a hydroxy acid or a salt thereof, or a phosphonate (i.e. organic phosphonate i.e. organophosphate i.e. HEDP) or a mixture thereof. According to the inventors pH of the composition is primarily neutral or slightly alkaline because strongly acidic wood preserving or fire-retarding compositions easily damage the structure of wood in course of time. Preferably pH is in the range from 6 to 11, ideally from 7 to 10, measured directly from the solution.

FI 122723 B (Kukkonen, Nissinen & Aksela) describes a wood material that is treated with a composition comprising at least one $C_1$-$C_7$ monocarboxylic acid or a salt, or mixtures thereof, and at least one chelating agent. According to the patent the composition for protecting wood against fire should contain chelating agents, such as HEDP in a content of 5 to 20 wt-%. The solution was impregnated into wood using pressure to result in a total penetrated amount of the fire prevention agent the total concentration effective agent of 22.7% for wood, corresponding to 176.2 kg/m³. The fire resistance of the impregnated test samples was evaluated according to the ISO 5660 fire test, based on which fire class B was achieved.

There are a number of problems relating to the known technology.

According to the safety data sheet and the product specification of a commercial ammoniated HEDP product (an ammonium salt of HEDP acid, marketed under the trade name Cublen K 3543) the minimum pH value for then product is 6.0 and the maximum is 7.0 and the dry residue content (i.e. the amount of ammonium salt of HEDP acid) is between 34 to 38 wt-% which means that the amount of HEDP acid itself is between 28 to 32 wt-%. The amount of ammonia required for neutralisation of HEDP acid to pH value of 6 to 7 is ca. 6 wt-%. In the case of ammoniated HEDP solutions of the above kind, pH values lower than 6 cause precipitation of crystals into the solution after few weeks storage time depending on the storage temperature. Specially at the temperatures below ca. 6° C. the formation of the precipitates can occur even within few days.

Especially at pH values higher than 7.0 there is a strong smell of ammonia due to a remarkable increase in evaporation of ammonia into the air. Even at pH values slightly higher than 6.0 will give rise to a distinct smell of ammonia. The maximum amount of accepted ammonia in air at indoor conditions in so called M1 classification is so low that ammonium salt of HEDP solution where pH value is higher than 6.0 does not meet the criteria. M1 classification is required by most customers that sell construction and building products such as fire retardant treated wood. This all means simple chemical consisting of ammonium salt of HEDP acid according to Zschimmer & Schwarz Cublen K 3543 product info, or chemical composition presented in SP Wood Technology SP REPORT 2006:30 or in cited patents such as FI 122723 and FI 121917 B (Mertaniemi et al.) & are unsuitable for the commercial usage. At pH less than 6.0 the ammonium salt of HEDP is unstable, it forms crystals and precipitates during storage time and at pH higher than ca. 6.0 it does not fulfil M1 criteria due to the evaporation of ammonia.

The main problems with the pressure impregnation using conventional inorganic fire retardants, such as ammonium phosphate (APP), MAP, DAP, borate or boric acid, are the high costs due to investment for the pressure impregnation equipment, the high amount of fire retardant required for B fire class, and the smoke generation.

If pressure impregnation is outsourced from the wood manufacturer the logistics cause cost and delays due to the fire retarding treatment and thus increase the price of the fire retardant treated wooden item. Moreover, high amount of fire retardant increases the generation of toxic smoke [Wang et al. (2014). Fire performance of plywood," BioResources 9(3), 4934-4945] which is undesired and does not fulfil fire class requirement such B-s1, d0 required at indoor applications.

Pressure impregnation also weakens the mechanical and physical properties of the wood, especially of the engineered wood products, such as CLT, LVL and plywood, that are so-called glued wood products.

Inorganic MAP, DAP, borate and boric acid fire retardants fulfil B class only if they are used in the pressure impregnation process because these fire retardants are not enough effective for the surface treatment processes such as brushing or spraying. In the surface treatment process less chemical can be applied into wooden item compared to pressure impregnation process.

Furthermore borax and boric acid containing fire retardant are included in the banned lists of chemicals in EU so most customers are not willing to use them anymore.

The most cost effective fire retardant treatment is simply to spread the fire retardant solution using normal surface treatment equipment such as spraying equipment or rollers over to wooden item and let it dry on stock without separate drying treatment. MAP, DAP and borate and boric acid based fire retardant easily form precipitates on the treated wooden items. If solid precipitates form over the wooden item such as plywood, the treated plywood panels cannot be separated from each other after the drying. The precipitates works as a glue between the panels. If panels are dried separately that will increase remarkably the cost of the treatment.

SUMMARY OF THE INVENTION

It is an aim of the present invention to eliminate at least a part of the problems relating to the art.

In particular, the present invention aims at provided novel and improved fire retardant compositions containing bisphosphonate useful as fire retarding agents or components thereof.

In the present invention it has surprisingly been found that by producing an aqueous composition, which contains HEDP in combination with alkaline agent and alkanol amines, in particular alkanol amines which are added into solution primarily in free form, a novel kind of fire retardant composition is achieved which is capable of achieving good fire retarding properties for wood products treated therewith. By contrast, the organic acid salts of ammonia in the above cited art have been found to increase the smoke generation rate and to increase ammonia release (ammonia smell) even at pH values close to 6 and moreover they loose chemical stability when pH is lowered below 6.

The present compositions can be produced by mixing, and optionally reacting, the components together.

The compositions can be used in a method for treating wood and wood-based products and for thus producing novel wood and wood-based products, which contain HEDP, alkanol amine and, optionally, a further alkaline agent or further alkaline agents and which exhibit good fire resistance.

More specifically, the present invention is characterized by what is stated in the characterizing parts of the independent claims.

Considerable advantages are obtained by the invention. According to the invention it is possible to manufacture the fire retardant treated wooden item in the most cost efficient, safe and environmentally benign way. The treated wood is endowed with excellent resistance fire without smoke generation or ammonia release: the fire retardant treated wooden item according to the invention fulfils the most demanding B-s1,d0 fire class e.g. in EU area.

The compositions are practically free from ammonial smell at the pH values for which good stability and extended shelf-life can be achieved. This advantages is achieved both during manufacture and storage. Thus, the compositions typically exhibit an ammonia release rate less than 0.03 mg/m$^2$h described in M1 classification and Protocol for Chemical and Sensory Testing of Building Material, Version 22.1.2015.

The composition of the invention is also stable at pH values in the neutral pH range or slightly acidic range, in particular the products are stable at pH less than 7.0, for example at pH of 4.0 up to 6.2, most preferably at pH of 5.0 up to 6.2 or 5.2 to 6.0. The compositions have an extended shelf life of over more than 6 months. Thus, at least for more than 6 months, the compositions will remain useable for the indicated purpose. Typically, the compositions will have a pH which lies within the pH range of less than 7.0, for example at pH of 4.0 up to 6.2, most preferably at pH of 5.0 up to 6.2 or 5.2 to 6.0, for more than 6 months.

Moreover, and quite surprisingly it has been found that the novel compositions have excellent properties of wood penetration—they absorb well into the treated wooden items and have excellent retention.

Further, it has been found that when the present compositions are used for treating plywood, there is no or practically no loss of strength properties in the plywood.

The present compositions can, without loss of stability and with excellent shelf-life, be prepared to a high concentration of active substance which gives the benefit that an improvement of fire resistance can be achieved even at low application amounts which, in turn, makes it possible to use convention gluing or application technologies for application. There is no mandatory need for resorting to pressure impregnation, although that technology is also possible when using diluted solutions.

No separate drying step is needed after application.

Further features and advantages will be clear from the following detailed description of embodiments.

DETAILED DESCRIPTION OF EMBODIMENTS

As briefly discussed above, the present compositions comprise an aqueous solution of a mixture or a reaction products of bisphosphonic acid selected from 1-hydroxyethane 1,1-diphosphonic acid, and an alkanol amine, and optionally an alkaline agent, and said composition having a pH in the range of 3.0 to 9.0, preferably in the range of 4.0 to 7.0.

In one embodiment, HEDP forms a salt (an acid salt) with the alkanol amine and/or alkaline agents. The acid salt is a salt formed from an acid (i.e. HEDP) with bases (i.e. alkanol amine and/or alkaline agents) by only partial replacement of hydrogen ions from the related acid i.e. HEDP, leaving some degree of acidity.

Thus, in one embodiment, a fire retardant composition with HEDP, alkaline agent and alkanol amine, which is added into the solution primarily in free form to give a pH of 4 to 7, appears to contain HEDP primarily or at least partially in the protonated form. But this is merely a suggestion and the scope of the present technology is not limited to the explanation.

In another embodiment, the alkaline agent is added in the form of a salt of HEDP. Thus, a salt of HEDP, formed from HEDP in acid form and at least one alkaline agent, is mixed with alkanol amine in the presence of water to provide an aqueous composition comprising a mixture or reaction product of bisphosphonic acid, alkaline agent(s) and alkanol amine(s) and having a pH in the range of 3.0 to 9.0, preferably in the range of 4.0 to 7.0.

According to one embodiment, by reacting first the alkaline agent and HEDP together, the alkaline agent reacts more efficiently without staying as a free component into the final solution. Through this neutralization reaction pH of the solution is increased, which after alkanol amine can be added to adjust the pH to appropriate level and to form amine-HEDP complex. Alkaline agent in the form of a salt of HEDP can be brought to the process as such or produced as a part of the process.

A composition achieved according to the present technology is capable of achieving good fire retarding properties for wood products treated therewith. By contrast, the organic acid salts of ammonia, such as ammonium carboxylate, in the above cited art have been found to increase the smoke generation rate and to increase ammonia release (ammonia smell) even at pH values close to 6 and moreover they loose chemical stability when pH is lowered below 6.

According to a preferred embodiment, the composition contains no carboxylic acids in free form or bound to the amine or alkaline component.

According to another embodiment, the composition is essentially free of carboxylic acids, i.e. comprises not more than 1%, preferably not more than 0.5%, by weight of carboxylic acids.

In the present context, the term "bisphosphonic acid" will be used for referring to the 1-hydroxyethane 1,1-diphosphonic acid component i.e. HEDP, and "bisphosphonate" will be used to refer to its anion(s). Obviously, depending on the pH of the composition, HEDP, even when added as a salt, will be partially or totally present in dissociated form (i.e. in protonated form).

The salt can be inorganic or organic, preferably inorganic. In particular the salt is formed from ammonia, although alkali metal and earth alkaline metal salts are also possible.

In the present context, the term "bisphosphonate component" covers both the bisphosphonic acid and the bisphosphonate anion(s) or "species".

Similarly, as used herein, the abbreviation "HEDP" and the name "1-hydroxyethane 1,1-diphosphonic acid" cover both the bisphosphonic acid as such and the corresponding bisphosphonate anion(s).

"pH" of the composition is measured directly from the solution, in particular aqueous solution.

Examples of other bisphosphonates and bisphosphonic acids, respectively, that can be used in the present technology, include the following: clodronate, tiludronate, pamidronate, neridronate, olpadronate, alendronate, ibandronate, risedronate or zoledronate or organic phosphonates such as aminomethylphosphonic acid (AMPA), vinylphosphonic acid, dimethyl methylphosphonate (DMMP), aminotrismethylenephosphonic acid (ATMP), ethylenediaminetetramethylenephosphonic acid (EDTMP), tetramethylenediaminetetramethylenephosphonic acid (TDTMP), hexamethylenediaminetetramethylenephosphonic acid HDTMP) diethylenetriaminepentamethylenephosphonic acid (DTPMP), phosphonobutanetricarboxylic acid (PBTC), N-phosphonomethyliminodiacetic acid (PMIDA), 2-carboxyethyl phosphonic acid (CEPA), 2-Hydroxyphosphonocarboxylic acid (HPAA), aminotrismethylenephosphonic acid (AMP), N,N-Bisphosphonomethylglycine (BPMG).

Although the present invention primarily concerns compositions and methods utilizing HEDP as bisphosphonic acid, it should be understood that HEDP can also be replaced, partially or totally, by another bisphosphonic acid or mixture of bisphosphonic acids, such as those mentioned below, or even by any other acid functioning in the same way as HEDP in combination with other components of the composition.

Thus, in one embodiment, the present technology provide a fire retardant composition for treatment of wood products, comprising an aqueous solution of a mixture or a reaction products of biphosphonic acid selected from 1-hydroxyethane 1,1-diphosphonic acid, clodronate, tiludronate, pamidronate, neridronate, olpadronate, alendronate, ibandronate, risedronate or zoledronate or organic phosphonates such as aminomethylphosphonic acid (AMPA), vinylphosphonic acid, dimethyl methylphosphonate (DMMP), aminotrismethylenephosphonic acid (ATMP), ethylenediaminetetramethylenephosphonic acid (EDTMP), tetramethylenediaminetetramethylenephosphonic acid (TDTMP), hexamethylenediaminetetramethylenephosphonic acid HDTMP) diethylenetriaminepentamethylenephosphonic acid (DTPMP), phosphonobutanetricarboxylic acid (PBTC), N-phosphonomethyliminodiacetic acid (PMIDA), 2-carboxyethyl phosphonic acid (CEPA), 2-Hydroxyphosphonocarboxylic acid (HPAA), aminotrismethylenephosphonic acid (AMP), N,N-Bisphosphonomethylglycine (BPMG) and combinations thereof, and an alkanol amine, and optionally an alkaline agent, and said composition having a pH in the range of 3.0 to 9.0, in particular 4.0 to 7.0.

In the present context, the term "alkanol amine" includes "alkyl alkanolamines" as will be discussed below.

The 1-hydroxyethane 1,1-diphosphonic acid in the aqueous solution is primarily present in acid form, and preferably at least 50 mole-% of the bisphosphonate is present as an acid.

In one embodiment, the present composition contains
0.1 to 50%, preferably 1.0 to 40% by weight, for example 20 to 40% by weight of 1-hydroxyethane 1,1-diphosphonic acid, or a mixture of 1-hydroxyethane 1,1-diphosphonic acid and other bisphosphonic acids or bisphosphonates and/or other organic phosphonates and/or other bisphosphonic acids or bisphosphonates, calculated from the amount of the dissolved components of the composition,
1 to 30% by weight of an alkanol amine or a mixture of alkanol amines calculated from the amount of the dissolved components of the composition, and optionally 1 to 30% by weight of an alkaline agent calculated from the amount of the dissolved components of the composition.

Alternatively, when the alkaline agent is ammonia, it can be introduced at least partially by adding the bisphosphonic acid in the form of its salt (as a "bisphosphonate"), as mentioned above. Thus in one embodiment, the present composition contains
0.1 to 70%, preferably 1.0 to 60% by weight, for example 20 to 50% by weight of 1-hydroxyethane 1,1-diphosphonic acid, or a mixture of 1-hydroxyethane 1,1-diphosphonic acid and other bisphosphonic acids or bisphosphonates and/or other organic phosphonates, calculated from the amount of the dissolved components of the composition, in the form of the salt of an alkaline agent, such as ammonia; and
1 to 30% by weight of an alkanol amine or a mixture of alkanol amines calculated from the amount of the dissolved components of the composition.

Addition of ammonia as an alkaline agent in the form of a salt of bisphosphonic acid decreases the amount of free ammonia, and thus ammonia smell, in the final solution and prevents the coloring of the solution.

In one preferred embodiment, the alkanol amine is selected from amines having the formula $$NR^1R^2R^3 \qquad \text{I}$$

wherein
$R^1$, $R^2$ and $R^3$ are independently selected from hydrogen and alkyl having 1 to 6 carbon atoms and optionally substituted with at least one substituent selected from hydroxyl groups, mono-, di- and tri-alkanol amines, such as mono-, di- and tri-$C_{1-6}$-alkanol amine.

For example, the alkanol amine can be selected from the group of monoethanolamine, monoisopropanolamine, mono-sec-butanolamine, diethanolamine, di-isopropanolamine, di-sec-butanolamine, triethanolamine and tri-isopropanolamine and mixtures thereof.

In another embodiment, the alkanol amine is selected from the group of alkyl alkanolamines, such as $C_{1-6}$-alkyl-$C_{1-6}$-alkanolamines, in particular from the group of methyl ethanolamine, butylethanolamine, dimethylethanolamine, diethylethanolamine, methyldiethanolamine and ethyldiethanolamine and mixtures thereof.

The alkanol amine can also comprise a mixture of alkanolamines and alkyl alkanolamines.

Although the typically basic alkanolamine will adjust the pH of the composition, in addition to the bisphosphonate component and the alkanol amine, the composition typically also contains a separate or second alkaline agent.

In one embodiment, the alkaline agent is selected from group of inorganic hydroxides and carbonates, such as alkali metal and earth alkaline metal hydroxides and carbonates, ammonia, ammonium hydroxide and mixtures thereof, the alkaline agent preferably being an aqueous solution of ammonia.

In one embodiment, the alkaline agent is selected from aqueous solutions of ammonia containing 1 to 25%, for example 10 to 25%, by weight of ammonia dissolved in water. In particular, aqueous solutions which are saturated in respect of ammonia are used. In one embodiment, an aqueous solution of ammonia having a pH of at least about 8.5, for example 9 to 13, is employed.

In case an inorganic hydroxide or carbonate is used, it is preferred to use a calcium-free component, since calcium ions may form an insoluble complex with the bisphosphonate. The alkaline agent is generally present in an amount sufficient to adjust the pH of the aqueous solution of the 1-hydroxyethane 1,1-diphosphonic acid and the alkanol amine to a value in the range of 3.0 to 9.0, for example 4.5 to 8.0, in particular 4.0 to 7.0, most preferably in the range of 5.0 to 6.0.

In one embodiment, the alkaline agent is present in an amount of 0.1 to 40% by weight of the solution, in particular 1 to 30% by weight of the solution.

In one embodiment, the composition has a pH in the range of 4.0 to 7.0, most preferably in the range of 5.0 to 6.5, for example 5.2 to 6.0.

Based on the above in one particularly preferred embodiment, the alkaline agent comprises aqueous ammonia water, the bisphosphonate component comprises 1-hydroxyethane 1,1-diphosphonic acid and the alkanol amine comprises monoethanolamine or triethanolamine or a mixture thereof.

As discussed above, in one embodiment 20 to 90 wt-%, for example 30 to 80 wt-% of the bisphosphonate component is added in the form of an ammonium salt, which is mixed with an alkanol amine and optionally water to provide an aqueous solution having a pH in the above-mentioned range of 4.0 to 7.0, in particular about 5.0 to 6.5, for example 5.2 to 6.2.

In one embodiment, a composition according to any one of the above embodiment has good stability, and typically the shelf-life is extended with at least up to 6 months, preferably more.

The compositions can be formulated for various application methods. In one embodiment, the water content of the aqueous composition is adjusted to a value of 35% by weight or more, typically up to 95% by weight. This will give a composition which is easy to apply by simple spraying or other surface treatment technique such as rolling. In another embodiment, the water content of the aqueous composition is adjusted to a value of less than 40%, in particular 35% or less, for example 10 to 35% by weight.

There can be further components incorporated into the composition such as retention agents and/or hydrofobizing agents which may be added to the composition of the invention. Suitable retention agents may be fatty acids, polymers such as starch, cellulose or derivatives thereof, chitosan and silicon compounds. Hydrophobizing agents include resins and derivatives thereof, surface sizes such as alkyl ketene dimer (AKD) or alkenylsuccinic acid (ASA), and tall oil and the derivatives thereof. AKD, ASA and/or tall oil and derivates thereof are preferably used as hydrofobizing agents, the preferable amount thereof being 0.01 to 5.0% by weight.

In another embodiment, the compositions contains surfactants that lower the surface tension of a liquid, allowing easier spreading, and lower the interfacial tension in between two liquids. A surfactant can be classified by the presence of formally charged groups in its head. A non-ionic surfactant has no charge groups in its head. The head of an ionic surfactant carries a net charge. If the charge is negative, the surfactant is more specifically called anionic; if the charge is positive, it is called cationic. If a surfactant contains a head with two oppositely charged groups, it is termed zwitterionic.

In one embodiment, the composition contains a further fire retardant, for example one selected from the group of ammonium phosphates, borate and boric acids and mixtures thereof or ferric phosphate.

In another embodiment, which can, for example, be combined with the previous one, the composition comprises a complexing agent, in particular the further complexing agent is selected from the group of ethylenediaminesuccinic acid, iminodisuccinic acid, N-bis-[2-(1,2-dicarboxyethoxy)-ethyl]-aspartic acid, ethylenediaminetetraacetic acid and diethylenetriaminepentaacetic acid and mixtures thereof.

In still a further embodiment, the composition consists only of the three components discussed earlier, viz. an alkaline agent, 1-hydroxyethane 1,1-diphosphonic acid and an alkanol amine, which all are dissolved or at least dispersed in water.

One important advantage of embodiments is that they are free or practically free from ammoniacal fumes and smells. In one embodiment, the composition exhibits an ammonia release rate less than the 0.03 $mg/m^2h$ described in M1 classifiction and Protocol for Chemical and Sensory Testing of Building Material. Version 22.1.2015.

The present compositions can be produced by mixing together HEDP with an alkanol amine or a mixture of alkanol amines and optionally with an alkaline agent, such as ammonia in water.

In one embodiment, the method of producing a fire retardant composition comprises mixing together 10 to 60, for example 30 to 50, parts by weight of HEDP;

1 to 10 parts by weight of an alkanol amine or mixture thereof, said alkanol amine being added in free form;

optionally 0.1 to 40 parts by weight of an alkaline agent, preferably an aqueous alkaline agent, such as an aqueous solution of ammonia or an alkaline metal or earth alkaline metal hydroxide or carbonate; and optionally water, to provide a composition having a pH in the range of 3 to 9, for example 4 to 7.

In another embodiment, the method of producing a fire retardant composition for treatment of wood products, comprising an aqueous solution of a mixture or a reaction products of a bisphosphonic acid and an alkanol amine, and optionally an alkaline agent, comprises mixing together 10 to 60, for example 30 to 50, parts by weight of a bisphosphonic acid;

1 to 10 parts by weight of an alkanol amine or mixture thereof, said alkanol amine being added in free form;

optionally 0.1 to 40 part by weight of an alkaline agent; and water, to provide a composition having a pH in the range of 3.0 to 9.0.

Mixing of the components is carried out at a temperature of 10 up to 100° C., preferably less than 100° C., in particular at about 10 to 60° C.

Typically, the composition has a water content of up to 60% by weight of the total composition. The components added typically contain water, but additional water is added to obtain a predetermined solid matter content of, for example 50% by weight or more, calculated from the total composition.

In embodiments of the method, the combined amount of the base equivalents of the alkanol amine and alkaline agent amounts to at least of 50% of the acid equivalents of HEDP or other bisphosphonic acid. In other words, the amine and any alkaline agent are added in sufficient amount to adjust the pH of the solution to a value which is higher than the pKa values of the first and second acid groups of HEDP or other bisphosphonic acid.

In one embodiment, a particularly interesting composition is obtained by mixing together 35 to 40 parts by weight of HEDP, provided in the form of an aqueous solution, 4 to 8 parts by weight of an alkanol amine selected from monoethanolamine, monoisopropanolamine, mono-sek-butanolamine, diethanolamine, di-isopropanolamine, di-sek-butanolamine, triethanolamine and triisopropanolamine and mixtures thereof, and 2 to 10 parts by weight of ammonia dissolved in water. Further, optionally 0.1 to 5 parts by weight of an ionic tenside is admixed, optionally provided in the form of an aqueous solution. Water is added, if necessary.

Embodiments also includes methods of treating wood products for conferring properties of fire retardancy to the wood products, comprising contacting the wood products with a composition according to any of the above-discussed embodiments.

By the surface treatment step, onto the wood product an amount of 10 to 500 g/m², for example 100 to 300 g/m², of the fire retardant composition is applied. In the pressure impregnation process an amount of 10 to 200 kg/m³, for example 25 to 100 kg/m³, of the fire retardant composition is applied.

The application can be carried out by methods known per se. In one embodiment, the composition is applied onto the wood product by spraying or rolling. In another embodiment, which can be combined with the previous, the composition is applied by pressure impregnation. In still a further embodiment, the wood product is contacted with the composition by immersion of the wood product into the aqueous composition.

The invention makes it possible to treat wood materials in a light and cost-efficient way, and the treatment can be easily included in other present-day steps of wood treatment. The process may be one step in a processing line of timber or wooden objects comprising successive steps.

The composition according to the invention is also pleasant to handle, because it does not emit strongly irritating odours for example ammonia gas. In the following, practical examples will be given of methods how the treatment composition can be used for the treatment of wood and how the treatment can be integrated in a wood material processing line in mills for wood processing.

1) Pressure Impregnation

A conventional method for entering great amounts of impregnation substance in wood, and thereby providing the most effective treatment by means of different steps (negative pressure and overpressure, elevated temperature). By this method, the best penetrability of compositions is obtained, and the wood can normally be impregnated to the core. The composition according to the invention has a very good penetrability, wherein it is possible to reduce the negative pressures/overpressures used in conventional CCA impregnation and thereby to improve the cost-effectiveness of the process. Also, a tighter-grained type of wood, such as spruce, can be pressure impregnated with the composition according to the invention, which has not been possible with conventionally used substances.

2) Immersion Impregnation

The penetrability of the composition according to the invention is good, and in some cases, mere immersion impregnation is also possible. This method is simple but it requires separate immersion basins and is carried out in batch processes, like the pressure impregnation.

3) Spraying or Rolling

The composition according to the invention can be sprayed or rolled onto the surface of wood, for example, in connection with the planing of sawn timber.

4) Painting or Other Surface Treatment Line

The composition according to the invention may also be added into the wood in connection with a painting or another surface treatment line. From a paint dosing tank, a wooden board can be impregnated with the solution under overpressure or negative pressure through a separate painting unit. Depending on the pressure and the speed of the line, good penetrability and thereby a good to fire can be achieved by this method.

Prior to the treatment of wood, the treatment composition may be diluted with water to give the concentration suitable for the treatment.

With respect to the specific application methods, the water concentration can vary, as mentioned earlier. Thus, for pressure impregnation, compositions containing up to 95% of water by mass can typically be employed; preferably the water concentration is about 60 to 90% by mass. Similarly, for spraying or rolling, compositions containing a majority of water, by mass, are typically used, such as 55 to 90% by mass. For immersion the water content is typically less than 80% by mass, for example 10 to 70%, or 20 to 60% by mass.

The composition may be absorbed to the wood to be treated over the whole thickness thereof, or to a certain depth from the surface, for instance by impregnation, immersion, spraying, vaporization (nebulization), or by application with a brush. Since various alternatives exist, the treatment may be carried out during other processing of wood at a suitable point, for instance during the final drying of wood. Physical properties of the composition such as viscosity may be adjusted according to the type and purpose of the treatment.

It should be noted that in an embodiment, the retention and fire protecton is improved by increasing the temperature of the solution and/or concentration of the fire retardant solution.

The impregnation of wood with a cell wall penetrating substance depends upon diffusion at a wood cellular level. The rate of diffusion depends upon the diffusion coefficient, temperature, and concentration of the chemicals. Maximum accessibility to the interior of the wood cell wall is achieved when the wood is in a swollen state, most readily achieved by water saturation of the material.

There are no permanent capillaries in the cell walls. When water is desorbed during drying, the microfibrils in the cell walls move closer together (shrinking). After re-wetting, the microfibrils move apart again (swelling), but not necessarily to the same positions as before, with water occupying all the spaces between microfibrils.

In a first embodiment, dry wood or wood material is contacted with a composition according to any of the above embodiments. It has been found that dry wood or wood material is a suitable material if the chemicals need to impregnate the bulk of the wood.

However, if the chemicals are required to diffuse into the wood cell wall it is important that the cell wall contains water. Thus, in a second embodiment, wet wood is contacted with a composition according to any of the above embodiments. The term "wet wood" denotes wood having a moisture content greater than 2% by weight, in particular greater than 20% by weight. In one embodiment, green wood is contacted with a composition according to any of the above embodiments.

Before application, the composition can be mixed with a glue used for bonding together two or more wood plies in order to form a multiply structure.

Typically, the composition is used for modifying the properties of wood products.

In the present context, the term "wood product" refers to any structure or article which comprises wood material for example in the form of mechanically produced massive structures, layers, chips or shavings and used as such or shaped into a secondary structure comprising in particular layers (veneer), chips or shavings glued together.

In one embodiment, the wood products which are contacted with the present compositions can be selected from the group of lumber and engineered wood products and multilayered wood products and panels. Examples include cross-laminated timber, laminated veneer lumber, wood-plastic composites and plywood as well as other wood based boards and panels, such as particle board, fiber boards, including medium and high density fiber boards, and orientated strand boards.

Further, the present compositions and methods can be used for treating acoustic boards, which at least partially are composed of wood material, for example in the form of fibrillated fibers. which optionally may be obtained from recycled wood fibers.

The present compositions and methods can also be used for modifying materials which contain cellulose-based substances, such as cellulose derivatives. Thus, the present compositions can be admixed with carboxymethyl cellulose to provide compositions which can be used as an adhesive for paper products, such as wall-papers, for cardboard products, such as corrugated cardboards, and for multilayered wood products, such as panels and boards.

The modified cellulose derivatives can be used, generally, as viscosity modifiers and thickeners.

The wood treatment agent according to the invention may be used for the protection of wood against one, or simultaneously against several detrimental environmental factors. Said factors besides fire mainly include mould, rot, blue stain, insect such as termites attacks on wood, dimensional changes, or a combination thereof due to environmental influence.

The composition may be tailored in correspondence with the respective protection needed and prioritized. Preferably, a composition simultaneously having sufficient activities against several different detrimental environmental influences is provided.

EXAMPLES

The following test solutions and fire retardant treatment have been carried out to illustrate the invention, but are not to be considered limiting of the scope of the invention.

Solution 1 (reference solution according to the U.S. Pat. No. 8,361,210 B2, Ahlnäs & Kukkonen) comprised the following components mixed together:
49.2 wt-% HEDP acid (60 wt-% solution) i.e. 29.5 wt-% HEDP;
10 wt-% 2-hydroxyethylammonium formate i.e. monoethanolammoniumformate i.e. ammonium carboxylate;
20.6 wt-% ammonia water (24.5 wt-%);
3.6 wt-% ionic tenside; and
16.6 wt-% water.
pH of the solution was 5.8 measured directly from the solution.
An amount of 250 g/m$^2$ of the solution 1 was applied onto surface of plywood board made of spruce.

Solution 2 (solution of the invention) comprised the following components mixed together:
60.8 wt-% HEDP acid (60 wt-% solution) i.e. 36.5 wt-% HEDP;
5.8 wt-% monoethanolamine;
23.4 wt-% ammonia water (24.5 wt-%);
3.5 wt-% ionic tenside; and
5.5 wt-% water
pH of the solution was 6.2 measured directly from the solution.
An amount of 250 g/m$^2$ of the solution 2 was applied onto surface of plywood board made of spruce.

Solution 3 (solution of the invention) comprised, mixed together, the following components:
60.8 wt-% HEDP acid (60 wt-% solution) i.e. 36.5 wt-% HEDP;
5.8 wt-% monoethanolamine;
24.2 wt-% ammonia water (24.5 wt-%);
3.5 wt-% ionic tenside; and
4.7 wt-% water
pH of the solution was 5.5 measured directly from the solution.
An amount of 250 g/m$^2$ of the solution 3 was applied onto surface of plywood board made of spruce.

Solution 4 (solution of the invention) comprised, mixed together, the following components:
60.8 wt-% HEDP acid (60 wt-% solution) i.e. 36.5 wt-% HEDP;
5.8 wt-% monoethanolamine;
20.0 wt-% ammonia water (24.5 wt-%);
3.4 wt-% ionic tenside; and
9.0 wt-% water.
pH of the solution was 5.2 measured directly from the solution.
An amount of 257 g/m$^2$ of the solution 4 was applied onto surface of plywood board made of spruce. The treatment was made using existing commercial surface treatment equipment at the plywood factory.

Solution 5 (reference solution):
89.29 wt-% Cublen K 3543 (an ammonium salt of HEDP acid, pH=7.0); and
10.71 wt-% HEDP acid (60 wt-% solution).
pH of the solution was 5.58 measured directly from the solution
Cublen K 3543 solution was bought from Oy Celego Ab, Finland.
The total amount of HEDP acid (as 100-wt %) of Solution 5 is 34.82 wt-%.

Solution 6 (solution according to invention) comprised, mixed together, the following components:
77.52 wt-% Cublen K 3543 (an ammonium salt of HEDP acid, pH=7.0);
18.60 wt-% HEDP acid (60 wt-% solution); and
3.88 wt-% monoethanolamine.
pH of the solution was 5.58 measured directly from the solution.
Cublen K 3543 solution was bought from Oy Celego Ab, Finland.
The total amount of HEDP acid (as 100-wt %) of the Solution 6 is 35.81 wt-%.

Solution 7 (reference solution according to the U.S. Pat. No. 8,361,210 B2, Ahlnäs & Kukkonen):
80.65 wt-% Cublen K 3543 (an ammonium salt of HEDP acid, pH=7.0);
9.68 wt-% HEDP acid (60 wt-% solution); and
9.68 wt-% wt-% 2-hydroxyethylammonium formate i.e. monoethanolammoniumformate i.e. ammonium carboxylate.
pH of the solution was 5.71 measured directly from the solution.
Cublen K 3543 solution was bought from Oy Celego Ab, Finland.
The total amount of HEDP acid (as 100-wt %) of the Solution 7 is 31.45 wt-%.

Example 1—Emission Measurement [Reasearch Report No. VTT-S-00351-17 & Työterveyslaitos Report 338763]

Standard References:
1. Protocol for Chemical and Sensory Testing of Building Material. Version 22.1.2015 (www.rts.fi)

2. SFS-EN SIO 16000-9 Determination of the emissions of volotile organic compounds from building products and furnishing. Emission test chamber method.
3. ISO 16000-6 Determination of volotile organic compounds in indoor and test chamber air by active sampling on Texax-TA sorbent, thermal desorption and gas chromatography using MS or MS-FID.
4. EN 717-1 Wood based panels—Determination of formaldehyde release—Parts 1: Formaldehyde emissions by chamber method October 2004.
5. In-house method. Determination of formaldehyde using spectometric acetylacetone-method.
6. In-house method. Determination of ammonium concentration in indoor air (VTT).
7. In-house method AR2303-TY-015, modified from OSHA ID-188 Determination of ammonium concentration in indoor air (Työterveyslaitos).

Emission measurements of volotile organic compound (VOC, TVOC), carsinogens, ammonia, and formaldehyde of the fire retardant treated plywood were performed for the test specimens conditioned for four weeks at standard conditions [1]. The temperature was 23° C. and RH was 50%.

VOCs were adsorbed on Texax TA absorbent [2]. VOC samples were analyzed with a gas chromatograph after thermal desorption [3]. The gas chromatograph is equipped with a flame ionisation deterteot (FID) and a mass selective detector (MSD).

The total amount of VOCs (TVOC) was determined summing the individual concentration of identified and unidentified compounds eluting from a gas chromatographic column between hexane and hexadecane inclusively, at concentration above 5 ug/m$^3$ in model room, all calculated as toluene equivalent. Single VOVs were identified from the mass selective detector total ion chromatogram using Wiley 275 spectral lirary and quantified from the FID-chromatogarm as toluene equivalents. Formaldehyde and ammonia were absorbed in dilute sulphuric acid. Formaldehyde was analyzed spectrophotometrically with acetylacetone method [4-5]. Ammonia was analyzed potentiometrically with ammonia specific electrode [6-7].

TABLE 1

Results of the emission measurements

| | TVOC mg/(m$^2$h) | Formaldehyde mg/(m$^2$h) | Ammonia mg/(m$^2$h) | Carsinogens mg/(m$^2$h) |
|---|---|---|---|---|
| Solution 1 | NA | NA | 0.107 | NA |
| Solution 2 | NA | NA | 0.078 | NA |
| Solution 3 | NA | NA | 0.028 | NA |
| Solution 4 | 0.019 | <0.005 | 0.008 | <0.001 |
| M1 classification criteria | <0.2 | <0.05 | <0.03 | <0.005 |

All solutions according to the invention show lower ammonia release rate than the reference solution. Results are surprising. The test solutions according to the invention have the same (test solution 4) or even higher amount of ammonia water (test solutions 1-3) than the test solution 1 (reference solution). Therefore it should be expected that the ammonia release is higher in the solutions according to the invention than in the reference solution. According to the open literature, the higher the amount of ammonia is and the higher pH of the solution is, the emissions of ammonia are higher.

Example 2—Fire Resistance Testing According to EN-ISO 5660-1:2002

The test specimens were conditioned at a room temperature of 23° C. and a relatively humidity of 50% to constant mass before tests. The ignition time and the maximum heat release rate of the test specimens in cone calorimeter tests at an irradiance of 50 kW/m$^2$ are shown in Table 2.

TABLE 2

Results of fire tests according to EN-ISO 5660-1: 2002

| | Ignition time, s | Maximum heat release rate, kW/m$^2$ |
|---|---|---|
| Solution 1 | 32.9 | 129.6 |
| Solution 3 | 70.5 | 86.1 |

The solution 3 according to the invention remarkably increased the fire resistance of the treated plywood.

Example 3—Determination of the Reaction to Fire Performance According to EN 13823:2010 and Classification of Reaction to Fire in Accordance with EN 13501-1:2007+A1:2009 [Classification Report No. VIT-S-03751-16]

Spruce plywood treated with solution according to the invention was fire tested and fire classified with 35 . . . 40 mm airgap. The thickness of the plywood was 15 mm and the retention of the fire retardant was 240 g/m$^2$. The product achieved B-s1, d0 classification. Open literature does not mention or know any wooden material that has been surface treated with fire retardant solution i.e. liquid which will achieve B-s1, d0 classification with an airgap. Typically airgap drops the fire class from B to C.

Example 4—Long Term Storage Stability

The solutions 2, 3 and 4 according to the invention were storaged at normal room conditions over 1 year and no precipitate formation was observed. The results are surprising because it was expected that precipitate formation would be observed especially in case of test solutions 3 and 4, where the pH value of the solutions is less than 6.0.

The solutions 5, 6 and 7 were produced on 30 Dec. 2016 and storaged at the temperature of +12° C. for 50 days. The solution 6 (pH=5.58) according to the invention was totally clear and homogeneous whereas the reference solutions 5 (pH=5.58) and 7 (pH=5.71) contained a lot of crystals and precipitates and were hazy. Moreover even when the solutions 5 and 7 were warmed to the temperature of 50° C. for two hours the crystals and precipitated of the solutions did not dissolve into the solutions.

Example 5—the Effect of a Fire Retardant on the Corrosion Resistance of Fasteners [Research Report No VTF-S-00090-17]

The effect of the fire retardant on the corrosion resistance of fasteners in the service classes 1, 2 and 3 of standard EN 1995-1-1:2004 was investigated. Four spruce plywood samples were surface treated with a fire retardant (solution 4, retention 257 g/m$^2$) and two reference plywood samples without any treatment with no additional treatment were used in the tests. Carbon steel nails without any coating, with zinc electroplating and hot dip galvanizing were used as a fasteners. Samples were tested in a condense test according to standard SFS-EN ISO 6270. The test duration was as follows: 5 days condensation (T=40° C., humidity=100% RH) followed by two days setting (chamber door closed, heating off). Two similar this kind of cycles were carried out, one simulating environment class 1 and one simulating class 2.

According to the results uncoated, zinc electrocoated and hot dip galvanized nails corroded slightly less in plywood treated with the fire retardant than in reference plywood without any treatments. In all service classes corresponding fasteners investigated can safely be used in connection of fireproofing treated plywood.

Results are surprising because it was expected to observe slight increased corrosion of fasterns because test solution 4 has slightly acid pH value. Usually at low pH the corrosion is more severe.

INDUSTRIAL APPLICABILITY

The present technology can be applied to treatment of wood products in generally. Representative examples include, as discussed above, lumber, engineered wood products, such as cross-laminated timber, multiply products, such as laminated veneer lumber, Wood-plastic composites and plywood boards as well as other wood based boards, such as particle boards, fiber boards, orientated strand boards and acoustic boards, and cellulose-based fibers or materials, such as cellulose insulation materials. The present technology, methods and compositions, can also be used for modifying cellulose substances, such as cellulose derivatives, for example carboxymethyl cellulose, that can be used for example as adhesives in paper products, cardboard products and generally as a viscosity modifier and thickener. Generally, wood product are provided which meet stringent requirements for fire protection, typically the present wood products meet fire class requirement according to B-s1, d0. 38. The present technology can also be used for protecting wood not only against fire but also, or alternatively, against mould, rot, blue stain, insect such as termites attacks on wood, dimensional changes, or a combination thereof due to environmental influence.

CITATION LIST

Patent Literature

U.S. Pat. No. 9,132,569 B2 (Saari)
U.S. Pat. No. 8,361,210 B2 (Ahlnäs & Kukkonen)
U.S. Pat. No. 9,125,404 B2 (Vuori & Nissinen)
FI 121917 B (Mertaniemi et al.)
FI 122723 B (Kukkonen, Nissinen & Aksela)

Non-Patent Literature

Birgit Östman et al., "Innovative eco-efficient high fire performance wood products for demanding applications", *Final report for Vinnova*-Tekes project InnoFireWood. SP Wood Technology SP REPORT 2006:30, Stockholm 2006.
Wang et al. (2014). "Fire performance of plywood", *BioResources* 9(3), 4934-4945.
ISO 5660-1:2015(en)—Reaction-to-fire tests.
Zschimmer & Schwarz Inc., Product Data Sheet for Cublen K60.
Research Report No VTI-S-00090-17.
Protocol for Chemical and Sensory Testing of Building Material. Version 22.1.2015 (www.rts.fi).
SFS-EN SIO 16000-9 Determination of the emissions of volotile organic compounds from building products and furnishing.
ISO 16000-6 Determination of volotile organic compounds in indoor and test chamber air by active sampling on Texax-TA sorbent, thermal desorption and gas chromatography using MS or MS-FID.
EN 717-1 Wood based panels—Determination of formaldehyde release—Parts 1: Formaldehyde emissions by chamber method October 2004.
OSHA ID-188 Determination of ammonium concentration in indoor air (Työterveyslaitos).

The invention claimed is:

1. A method of treating a wood product for conferring properties of fire retardancy to the wood product, comprising:
    forming a fire retardant composition comprising an aqueous solution of a mixture or a reaction product of 1-hydroxyethane-1,1-disphosphonic acid (HEDP) and an alkanol amine, and optionally an alkaline agent, wherein at least 75 mole-% of the alkanol amine is added in free form to form the fire retardant composition, said composition having a pH in the range of 3.0 to 9.0; and
    contacting the wood product with said fire retardant composition in an amount sufficient to confer properties of fire retardancy to the wood product.

2. The method according to claim 1, wherein the composition comprises 0.1 to 50% by weight of 1-hydroxyethane-1,1-diphosphonic acid in mixture with other bisphosphonates, organic phosphonate, calculated from an amount of dissolved components of the composition.

3. The method according to claim 1, wherein the composition comprises a mixture of 1-hydroxyethane 1,1-diphosphonic acid and other bisphosphonic acids or bisphosphonates and/or other organic phosphonates, in the form of the salt of an alkaline agent,
    wherein the hydroxyethane-1,1-diphosphonic acid comprises 0.1 to 70% by weight, calculated from an amount of dissolved components of the composition,
    wherein the alkanol amine comprises 1 to 30% by weight, calculated from an amount of dissolved components of the composition, and
    wherein said composition comprises a pH of 4.0 to 7.0.

4. The method according to claim 1, wherein the alkaline agent is selected from group consisting of calcium-free inorganic hydroxides and carbonates, ammonia, ammonium hydroxide, and mixtures thereof, and wherein the alkaline agent is present in an amount of 0.1 to 40% by weight of the aqueous solution.

5. The method according to claim 1, wherein the alkaline agent is present and comprises ammonia, added in the form of an aqueous solution of 1 to 25% by weight of ammonia in water.

6. The method according to claim 1, wherein the alkanol amine is selected from an amine having the formula:

$$NR^1R^2R^3 \qquad \qquad I$$

wherein $R^1$, $R^2$ and $R^3$ are independently selected from hydrogen and alkyl having 1 to 6 carbon atoms and optionally substituted with at least one substituent selected from hydroxyl groups, mono-, di- and tri-alkanol amines.

7. The method according to claim 1, wherein the alkanol amine is selected from the group consisting of monoethanolamine, monoisopropanolamine, mono-sek-butanolamine, diethanolamine, di-isopropanolamine, di-sek-butanolamine, triethanolamine, triisopropanolamine, a C1-6-alkyl-C1-6-alkanolamine, and mixtures thereof.

8. The method according to claim 1, wherein the composition comprises up to 95% by weight of water.

9. The method according to claim 1, the composition consisting of the alkaline agent, 1-hydroxyethane-1,1-diphosphonic acid, and the alkanol amine, which all are dissolved or dispersed in water.

10. The method according to claim 1, further comprising a fire retardant selected from the group consisting of ammonium phosphate, borate, a boric acid, and mixtures thereof.

11. The method according to claim 1, wherein the composition exhibits an ammonia release rate less than 0.03 mg/m$^2$h described in M1 classification and Protocol for Chemical and Sensory Testing of Building Material, Version 22.1.2015, and wherein the composition comprises no carboxylic acids in free form or bound to a component therein.

12. The method according to claim 1, wherein the pH comprises a pH of 3.0 to 9.0, and wherein the composition comprises, calculated from the dry weight of the composition:
   10 to 60 parts by weight of 1-hydroxyethane 1,1-diphosphonic acid or 1-hydroxyethane 1,1-diphosphonate;
   1 to 10 parts by weight of an alkanol amine or mixture thereof, said alkanol amine being added in free form;
   0.1 to 40 part by weight of an alkaline agent of ammonia; and
   water.

13. The method according to claim 1, wherein the composition comprises the 1-hydroxyethane 1,1-diphosphonic acid in a form of a salt with the alkaline agent.

14. The method according to claim 1, wherein the contacting is done by spraying, pressure impregnation, or by immersion of the wood product into the fire retardant composition.

15. The method according to claim 1, further comprising mixing the composition with an adhesive for bonding together two or more wood plies in order to form a multiply structure.

16. The method according to claim 1, wherein the fire retardant composition further protects the wood against one or more detrimental environmental factors selected from the group consisting of mould, rot, blue stain, insects, dimensional changes, and combinations thereof.

17. The method according to claim 1, wherein said composition contains no carboxylic acids in free form or bound to the alkanol amine or alkaline component.

* * * * *